United States Patent
Oho et al.

(10) Patent No.: US 10,481,046 B2
(45) Date of Patent: Nov. 19, 2019

(54) MANAGEMENT SYSTEM, MANAGEMENT DEVICE, SPINDLE FAILURE DETECTION METHOD USING MANAGEMENT DEVICE, AND NON-TRANSITORY COMPUTER READABLE MEDIUM ENCODED WITH COMPUTER PROGRAM

(71) Applicant: FANUC CORPORATION, Yamanashi (JP)

(72) Inventors: Yuusaku Oho, Yamanashi (JP); Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 116 days.

(21) Appl. No.: 15/715,584

(22) Filed: Sep. 26, 2017

(65) Prior Publication Data

US 2018/0088007 A1   Mar. 29, 2018

(30) Foreign Application Priority Data

Sep. 28, 2016 (JP) ................................. 2016-190337

(51) Int. Cl.
  *G01M 99/00* (2011.01)
  *G01H 17/00* (2006.01)
  (Continued)

(52) U.S. Cl.
  CPC .......... *G01M 99/008* (2013.01); *G01H 1/003* (2013.01); *G01H 17/00* (2013.01);
  (Continued)

(58) Field of Classification Search
  CPC ..... G01M 99/008; G01H 1/003; G01H 17/00; G08B 21/187; Y02P 90/14; G05B 2219/50041
  See application file for complete search history.

(56) References Cited

FOREIGN PATENT DOCUMENTS

| JP | 59-49145 | 11/1984 |
|---|---|---|
| JP | 04-063662 | 2/1992 |

(Continued)

OTHER PUBLICATIONS

Chang et al., The Development of a Monitoring System Using a Wireless and Powerless Sensing Node Deployed Inside a Spindle, Dec. 22, 2011, Sensors 2012, vol. 12, pp. 24-41 (Year: 2011).*

(Continued)

*Primary Examiner* — Toan M Le
(74) *Attorney, Agent, or Firm* — Wenderoth, Lind & Ponack, L.L.P.

(57) ABSTRACT

A management system including a network, plural manufacturing cells connected to the network, and a management device that is connected to the network and manages the plurality of manufacturing cells, in which the manufacturing cell includes: a machine tool; and a control device that controls the machine tool, analyzes a vibration state of a spindle positioning shaft of the machine tool, and sends an analysis result via the network; in which the management device includes: a communication unit that receives the analysis result sent by the control device; and a detection unit that compares the analysis results thus received, and compares vibration states of the machine tool of each of the manufacturing cells, so as to detect spindle failure of any of the machine tools; and in which the communication unit, in a case of the detection unit detecting the spindle failure, sends a failure signal via the network.

7 Claims, 6 Drawing Sheets

(51) Int. Cl.
*G05B 19/048* (2006.01)
*G08B 21/18* (2006.01)
*G01H 1/00* (2006.01)
*G05B 19/4065* (2006.01)
*H04L 29/08* (2006.01)

(52) U.S. Cl.
CPC ....... *G05B 19/048* (2013.01); *G05B 19/4065* (2013.01); *G08B 21/187* (2013.01); *G05B 2219/37245* (2013.01); *G05B 2219/37434* (2013.01); *G05B 2219/49105* (2013.01); *G05B 2219/50041* (2013.01); *G05B 2219/50185* (2013.01); *H04L 67/12* (2013.01); *Y02P 90/14* (2015.11); *Y02P 90/18* (2015.11)

(56) References Cited

FOREIGN PATENT DOCUMENTS

| | | |
|---|---|---|
| JP | 2002-132321 | 5/2002 |
| JP | 2005-74545 | 3/2005 |
| JP | 2009-282822 | 12/2009 |

OTHER PUBLICATIONS

Notification of Reasons for Refusal dated Nov. 6, 2018 in Japanese Patent Application No. 2016-190337.

\* cited by examiner

MANAGEMENT SYSTEM, MANAGEMENT DEVICE, SPINDLE FAILURE DETECTION METHOD USING MANAGEMENT DEVICE, AND NON-TRANSITORY COMPUTER READABLE MEDIUM ENCODED WITH COMPUTER PROGRAM

This application is based on and claims the benefit of priority from Japanese Patent Application No. 2016-190337, filed on 28 Sep. 2016, the content of which is incorporated herein by reference.

BACKGROUND OF THE INVENTION

Field of the Invention

The present invention relates to a management system that detects spindle failure in a machine tool. In particular, it relates to a management device that manages a plurality of machine tools connected to a network, and detects spindle failure in the machine tool, and a non-transitory computer readable medium encoded with a computer program. In addition, it relates to a spindle failure detection method using the management device.

Related Art

Conventionally, if spindle failure of a machine tool occurs, the machining precision on a workpiece which is the machining target will decline, and there is a possibility of producing a defective workpiece. It should be noted that "spindle failure" refers to the matter of damage, wear, deformation of each part of the spindle, and entering a state in which each part of the spindle cannot exhibit the original function thereof, and for example, a case of a bearing of the spindle, etc. being damaged can be exemplified. Damage/wear/deformation of components pertaining (installed) to the spindle, and the matter of entering a state in which these components cannot exhibit the functions thereof, may be encompassed by "spindle failure".

As one technique for avoiding a decline, etc. in machining precision of a workpiece caused by spindle failure in this way, it has been considered to adopt a device that detects spindle failure. For example, in a case of a bearing or the like of the spindle being damaged, it has been known that vibrations of a specific frequency will generate according to the balls (steel balls), etc. constituting the bearing in the thrust direction and radial direction of the spindle. Therefore, it has been considered to install an AE (Acoustic Emission) sensor or acceleration sensor to the spindle so as to configure a device that detects anomalies by analyzing these sensor outputs.

Figure 4:
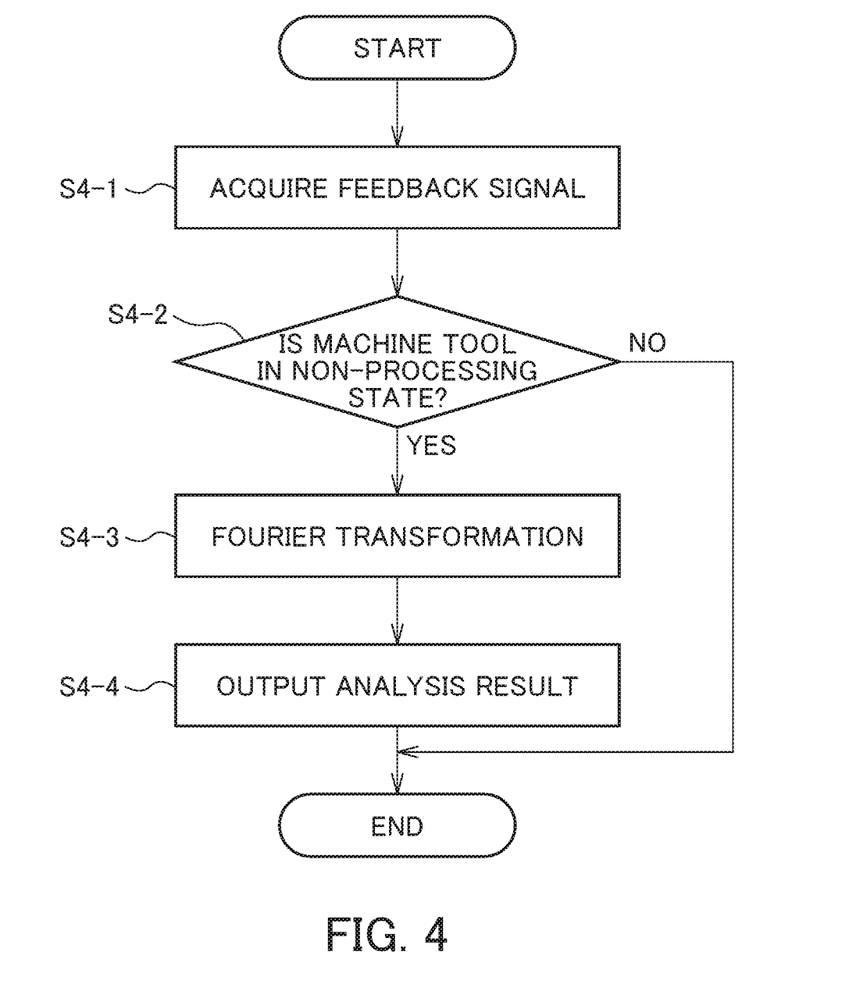
FIG. 4 is a flowchart showing operations of the control device according to the present embodiment.
Figure 6:
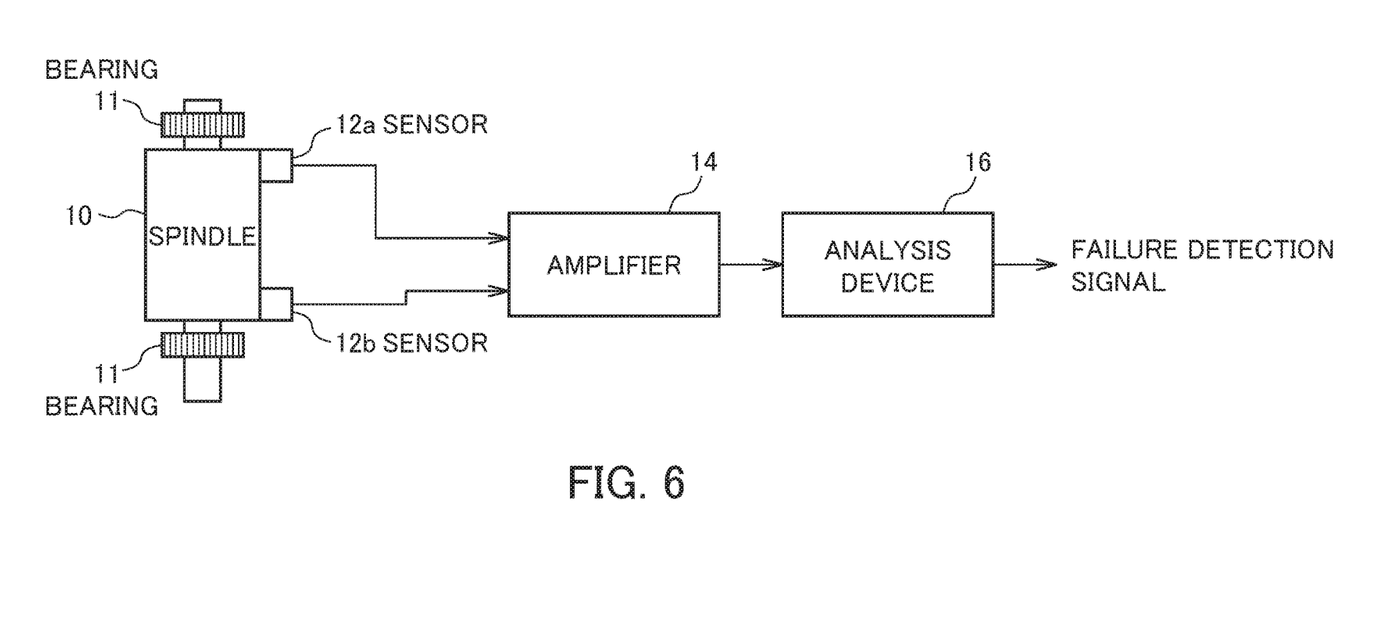
FIG. 6 is a configuration diagram of conventional equipment upon detecting spindle failure.

For a machine tool in the case of installing sensors to the spindle and using a device that analyzes the sensor output thereof in this way, a block diagram of the configuration for detecting anomalies is shown in. FIG. 4. First, as shown in FIG. 6, sensors 12a, 12b are installed to the spindle 10. Herein, the sensor 12a is an AE sensor, for example, and the sensor 12b may be established as an acceleration sensor. The output signals of these sensors 12a, 12b are amplified by an amplifier 14, and supplied to an analysis device 16. The analysis device 16 is a computer, for example, and in the case of analyzing the output signals of the sensors 12a, 12b and determining that an anomaly is occurring, externally outputs a failure detection signal. A program of the computer, which is the analysis device 16, executes analysis of the output signals of the sensors 12a, 12b by a predetermined algorithm, to determine whether or not an anomaly is occurring. In addition, the principle of such an analysis device 16, and a method of detecting spindle failure using a device such as the analysis device 16 are disclosed in Patent Document 1 noted below, for example.

On the other hand, a method of detecting failure of each part of a machine tool by detecting the load fluctuation from the electrical current value of a spindle motor or the like is disclosed in Patent Document 2 noted below. The method disclosed in this document has the object of mainly performing detection of load fluctuation, particularly damage of the tool based on the load fluctuation. This method described in Patent Document 2 records and detects load fluctuation, i.e. only load amount, and the fluctuation of specific frequencies are not recorded.

Patent Document 1: Japanese Unexamined Patent Application, Publication No. 2005-74545
Patent Document 2: Japanese Examined Patent Application Publication No. S59-49145

SUMMARY OF THE INVENTION

In the case of using the conventional technology (Patent Document 1) employing the new sensor 12 in this way, it is necessary to add the new sensor 12 and analysis device 16, and thus the device configuration becomes complicated. Furthermore, installation space for this sensor 12 and analysis device 16 becomes necessary. In addition, with the method of detecting the load fluctuation from the electric current value of the motor (Patent Document 2), although it is possible to detect phenomena related to load, it has been considered difficult to detect spindle failure such as damage of the bearings. Furthermore, with this method, a specific frequency fluctuation is not recorded by only detecting the load fluctuation.

With such conventional technology for failure detection, it is not being assumed to detect faults collectively for a plurality of machine tools. For this reason, in the case of a plurality of machine tools existing on a network (for example, LAN inside factory, etc.), it is necessary to provide an analysis device to every machine tool, and detect the load fluctuation in every machine tool, and thus the overall system tends to be complicated and large scale. The present invention has been made taking account of such problems, and an object thereof is to provide technology enabling to efficiently detect failure of a plurality of machine tools connected by a network by way of a simpler configuration.

However, the inventors in the present disclosure have uniquely discovered technology for performing failure detection of the spindle of a machine tool equipped with a spindle and a feed shaft, using the feedback of a servomotor for positioning of the spindle. This unique technology, for example, can detect failure of a spindle by analyzing the feedback of a servomotor for positioning in the spindle direction, which is the same as the vibrations in a thrust direction occurring during spindle failure. Using this unique technology, it is possible to perform failure detection for the aforementioned such plurality of machine tools. In particularly, by comparing the analysis results among the plurality of machine tools, the present invention realizes the detecting of spindle failure efficiently with a simpler configuration. The specific means employed by the present invention are as follows.

According to a first aspect of the present invention, a management system (e.g., the production management system 30 described later) includes: a network, a plurality of manufacturing cells (e.g., the manufacturing cell 104 described later) connected to the network, and a management device (e.g., the production management device 100 described later) that is connected to the network and manages the plurality of manufacturing cells, in which the manufacturing cell includes: a machine tool; and a control device (e.g., the control device 22 described later) that controls the machine tool, analyzes a vibration state of a spindle positioning shaft of the machine tool, and sends an analysis result via the network, in which the management device includes: a communication unit (e.g., the communication unit 502 described later) that receives the analysis result sent by the control device; and a detection unit (e.g., the detection unit 504 described later) that compares the analysis results thus received, and compares vibration states of the machine tool of each of the manufacturing cells, so as to detect spindle failure of any of the machine tools, and in which the communication unit, in a case of the detection unit detecting the spindle failure, sends a failure signal via the network.

According to a second aspect of the present invention, the management device used in the management system as described in the first aspect may include: a communication unit that receives the analysis result sent by the control device; and a detection unit that compares the analysis result thus received, and compares vibration states of the machine tools of each of the manufacturing cells, so as to detect spindle failure in any of the machine tools, in which the communication unit, in a case of the detection unit detecting the spindle failure, may send a failure signal via the network.

According to a third aspect of the present invention, in the management device as described in the second aspect, the detection unit may compare frequency spectral intensities of the vibration state of each of the machine tools based on the analysis results thus received; detect a frequency spectrum having an intensity differing by at least a predetermined threshold; and periodically monitor a change in intensity of the spectrum detected so as to detect spindle failure of the machine tool.

According to a fourth aspect of the present invention, in the management device as described in the second or third aspect, the detection unit may compare frequency spectral intensities of the vibration state of each of the machine tools based on the analysis results thus received, and determine that spindle failure occurred in the machine tool having a frequency spectral intensity that differs in intensity by at least a predetermined threshold.

According to a fifth aspect of the present invention, in the management device as described in any one of the second to fourth aspects, the communication unit may periodically receive spectral intensity of a predetermined frequency range in the analysis results via the network.

According to a sixth aspect of the present invention, in the management system as described in the first aspect, the control device may perform frequency analysis on a feedback signal of a spindle positioning servomotor of the spindle positioning shaft of the machine tool in a predetermined spindle state; obtain a frequency spectral intensity; and send the analysis result including the frequency spectral intensity.

According to a seventh aspect of the present invention, in the management device as described in any one of the second to fifth aspects, the communication unit, in a case of the detection unit detecting the spindle failure, may send a failure signal via the network to either one or both of a higher-order control device and the manufacturing cell having the machine tool in which the failure was detected.

According to an eighth aspect of the present invention, in a method of detecting spindle failure that detects spindle failure in a machine tool by employing the management device used in the management system as described in the first aspect, the method includes: a first communication step of receiving the analysis result sent by the control device; a detection step of comparing the analysis result thus received, comparing the vibration state of the machine tool in each of the manufacturing cells, and detecting spindle failure in any of the machine tools; and a second communication step of sending a failure signal via the network, in a case of detecting the spindle failure in the detection step.

According to a ninth aspect of the present invention, in a non-transitory computer readable medium encoded with a computer program enabling a computer to function as the management device used in the management system as described in the first aspect, the program causes the computer to execute: first communication processing of receiving the analysis result sent by the control device; detection processing of comparing the analysis result thus received, comparing the vibration state of the machine tool in each of the manufacturing cells, and detecting spindle failure in any the machine tools; and second communication processing of sending a failure signal via the network, in a case of detecting the spindle failure in the detection processing.

According to the present invention, it is possible to efficiently perform failure detection in a plurality of machine tools connected by a network, without providing special external sensors.

DETAILED DESCRIPTION OF THE INVENTION

Figure 1:
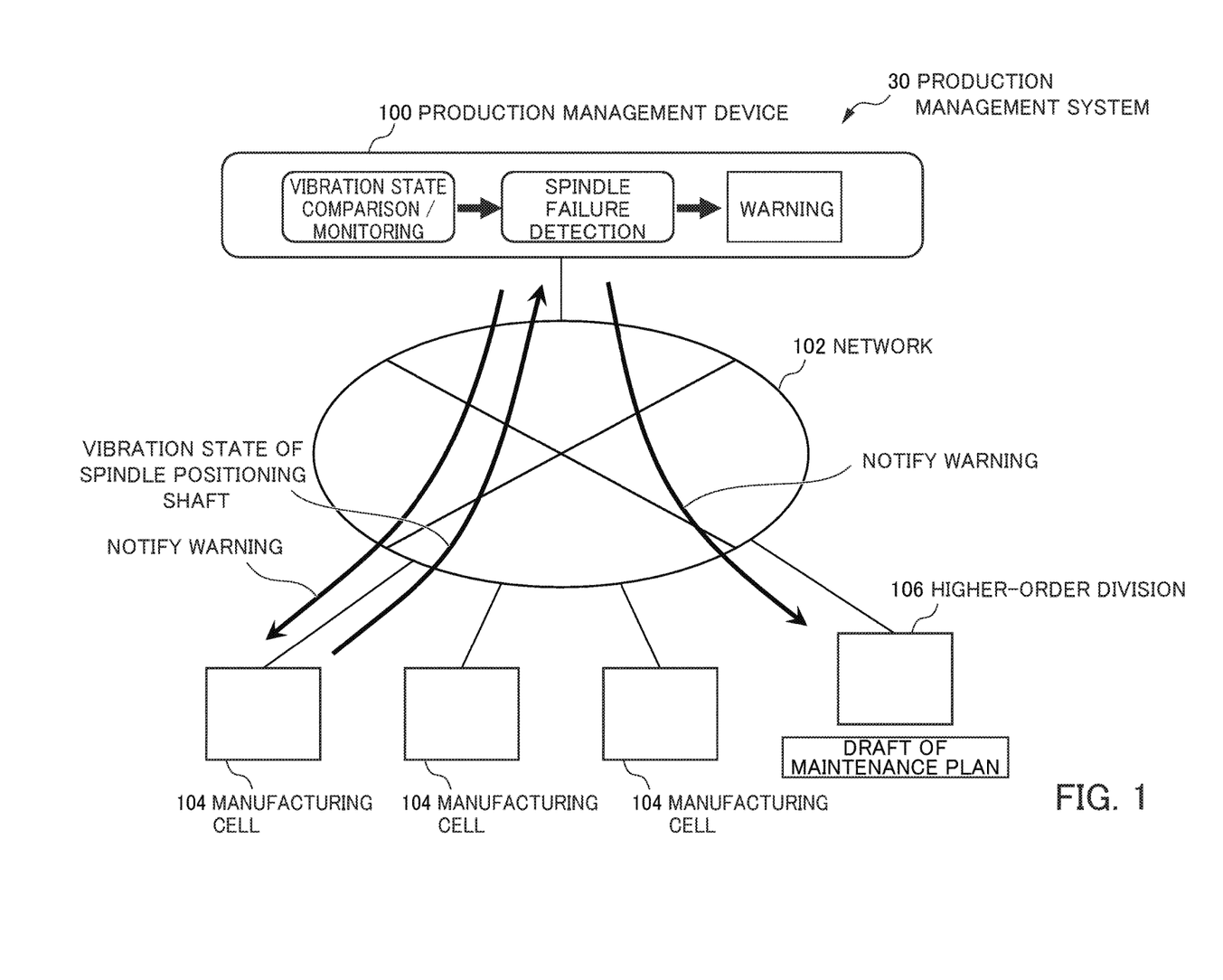
FIG. 1 is an overall configuration diagram of a production management system including a production management device according the present embodiment.

Hereinafter, preferred examples of embodiments of the present invention will be explained based on the drawings.
1. Configuration of production management system including Production Management Device Of Present Embodiment FIG. 1 is an overall configuration diagram of a production management system 30 including a production management device 100 according to the present embodiment. The production management system 30 of the present embodiment is the production management system 30 of a factory, etc., in which a production management device 100, each manufacturing cell 104 and a higher-order management section 106 are connected via a network 102. The production management system 30 corresponds to a preferred example of a management system in the claims.

The network 102 is a communication network such as LAN (Local Area Network) within a factory, and may be wired or wireless. In addition, it may be configured by EtherNet®, for example. Furthermore, the network corresponds to a preferred example of a network in the claims. The manufacturing cell 104 is a manufacturing cell including a machine tool and a control device 22 which controls this machine tool. Although an example of including one machine tool and one of the control devices 22 is explained in the present embodiment, a plurality of machine tools and/or a plurality of control devices 22 may be included therein. In addition, the manufacturing cell corresponds to a preferred example of a manufacturing cell in the claims.

Figure 2:
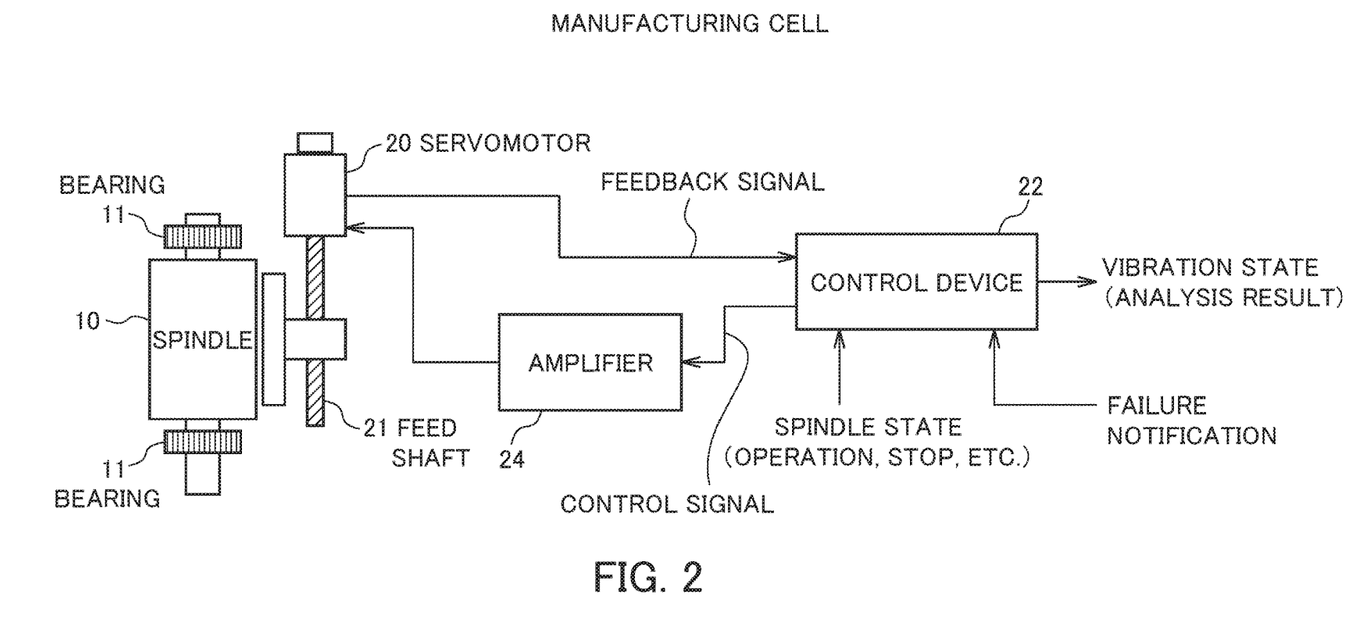
FIG. 2 is a configurational block diagram of a manufacturing cell according to the present embodiment.

FIG. 2 illustrates a configuration diagram showing a preferred example of the manufacturing cell 104. For facilitating understanding, FIG. 2 shows the configuration of a part of the machine tool, i.e. configuration centering around the spindle 10, and the control device 22 which controls the machine tool. The spindle 10 of the machine tool is supported by bearings 11, and is rotatable around the axis of the spindle 10. Furthermore, the machine tool according to the present embodiment includes a servomotor 20 for positioning of the spindle 10, and can drive a feed shaft 21 to decide the position of the spindle 10 by causing this servomotor 20 to rotate. It should be noted that the feed shaft 21 corresponds to a preferred example of a spindle positioning shaft.

As shown in FIG. 2, the machine tool according to the present embodiment controls the servomotor 20 using this control device 22. In addition, a control signal outputted by the control device 22 is amplified by an amplifier 24, and then outputted to the servomotor 20. In addition, a feedback signal is outputted from the servomotor 20 to the control device 22 (refer to FIG. 2).

The control device 22 according to the present embodiment detects spindle failure by analyzing the feedback signal obtained from the servomotor 20. By way of such a configuration, it is unnecessary to provide special sensors or analysis devices, and it is possible to detect spindle failure with a simpler configuration. By way of such a configuration, the control device 22 can analyze the feedback signal of the servomotor 20 for positioning in the same direction as the vibrations in the thrust direction occurring during spindle failure, for example. Then, the results of such analysis are outputted via the network 102 to outside with a signal representing a vibration state as a vibration state (vibration analysis results). These outputted analysis results may include various analysis results, and may include a frequency spectra intensity obtained by Fourier transform, etc. It should be noted that the control device 22, in the case of the signal intensity of vibrations in the thrust direction being greater than a predetermined threshold, determines that spindle failure has occurred, and may output a detection signal such as that indicating failure to outside.

In addition, the control device 22 may be supplied information of "spindle state", signal indicating analysis start, etc. from outside; however, various determinations may be performed using these. It should be noted that the control device 22 corresponds to a preferred example of a control device in the claims. In addition, the servomotor 20 corresponds to a preferred example of a positioning servomotor in the claims.

2. Configuration and operation of control device 22

Figure 3:
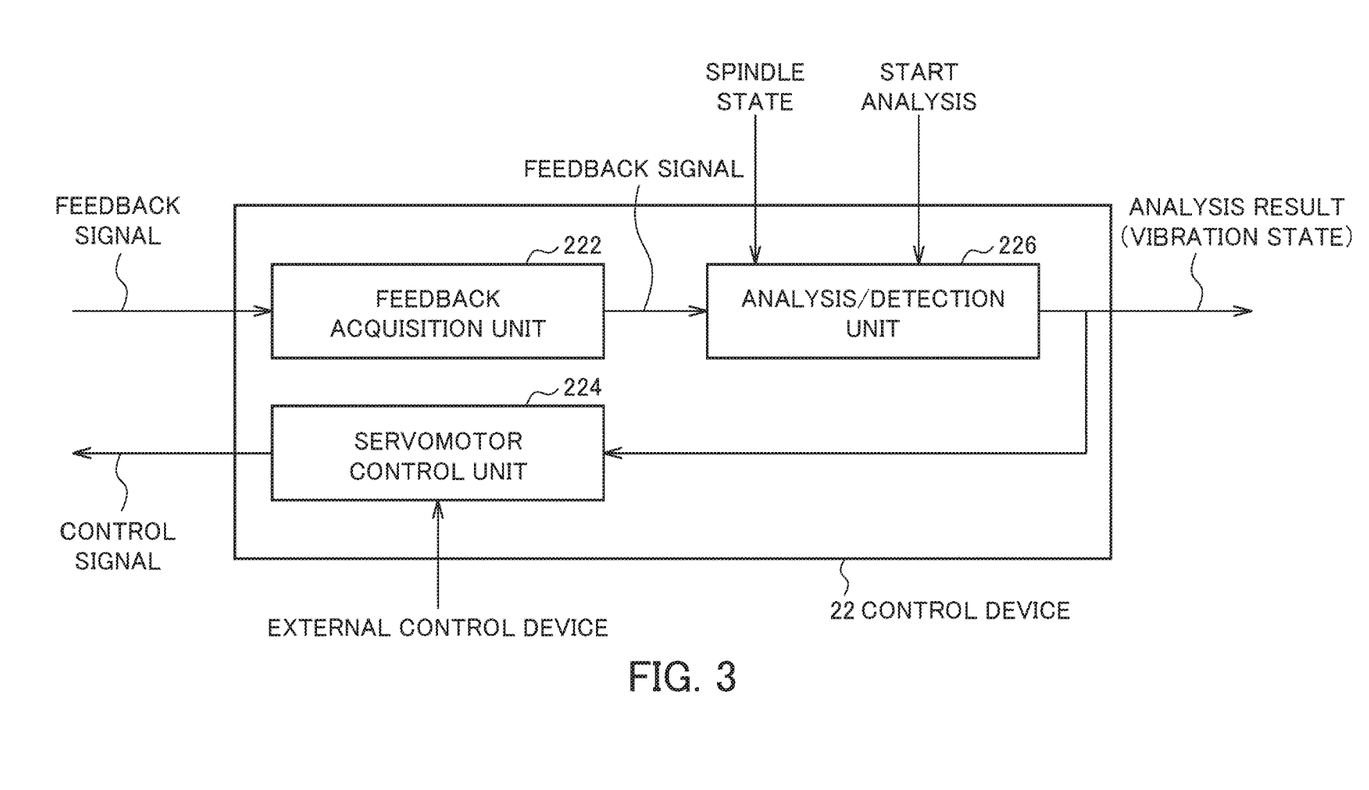
FIG. 3 is a configurational block diagram of a control device according to the present embodiment.

FIG. 3 shows a configuration diagram of the control device 22 of the present embodiment. The control device 22 is preferably configured by a computer, for example, and each part shown in FIG. 2 is also preferably configured from the hardware (CPU, interface with each part) and programs (programs realizing each function of the control device 22) of a computer.

As shown in FIG. 3, the control device 22 includes a feedback acquisition unit 222, servomotor control unit 224, and analysis/detection unit 226.

2.1 Feedback Acquisition Unit

The feedback acquisition unit 222 is an interface which receives a feedback signal supplied from the servomotor 20, and it is suitable to use the I/O interface of a computer. In addition, the feedback acquisition unit 222, in the case of the feedback signal outputted from the servomotor 20 being an analog signal, may be equipped with an AD conversion function for converting this into a digital signal. The feedback acquisition unit 222 supplies a feedback signal acquired in this way to the analysis/detection unit 226. Reception processing of such a feedback signal corresponds to Step S4-1 in FIG. 4. The feedback signal outputted by the servomotor 20 can employ signals of at least one type among an electric current value, speed or position of the servomotor 20. These signals are signals representing operation of the servomotor 20; therefore, it is considered possible to more accurately detect spindle failure if analyzing any of these signals. The feedback acquisition unit 222 supplies these signals to the analysis/detection unit 226, after converting to digital signals as necessary.

The feedback acquisition unit 222 is constituted by hardware such as an I/O interface and AD conversion means as mentioned above; however, it may be constituted by programs controlling this I/O interface, AD conversion means, etc., and the CPU of a computer executing these programs.

2.2 Servomotor Control Unit

The servomotor control unit 224 outputs control signals for the servomotor 20 following the commands from an external control device (not illustrated). The amplifier 24 in FIG. 1 amplifies the control signal up to an electric power that can drive the servomotor 20, and applies the amplified control signal to the servomotor 20. This servomotor control unit 224 is configured by an interface which outputs the control signal to outside, a program creating the control signal based on commands from a higher-order control device, and the CPU of a computer executing this program.

2.3 Analysis/Detection Unit

The analysis/detection unit 226 analyzes the feedback signal acquired by the feedback acquisition unit 222. Analysis in the present embodiment is processing of converting the feedback signal into frequency spectral intensity using Fourier transformation, etc. This analysis/detection unit 226 analyzes the feedback signal; however, an example of performing analysis in the case of the machine tool being a non-processing state is explained in particular in the present embodiment. As a matter of course, the feedback signal may be analyzed in the case of being a processing state. Whether or not being a non-processing state may be determined using various signals from outside. Whether or not the machine tool is a processing state can be known by various methods. For example, it is suitable to know whether the machine tool is a processing state or a non-processing state by a signal from an external control device. Although the external control device is preferably a numerical control or the like, it may be various computers or terminals operated by an operator. The analysis/detection unit 226 executes processing of inspecting whether the machine tool is a processing state or a non-processing state in this way, and this processing corresponds to Step S4-2 in FIG. 4.

In the case of the machine tool being a non-processing state, the analysis/detection unit 226 conducts Fourier transformation on the feedback signal to convert to frequency spectral intensity.

The analysis/detection unit 226 may send as is the obtained frequency spectral intensity as the analysis result on the network 102; however, the data volume tends to become enormous. Therefore, in the present embodiment, the analysis/detection unit 226 detects the frequency possessing the amplitude value (peak value) of at least a predetermined threshold from among the frequency spectral intensity, and sends only the frequency at which this intensity (amplitude/peak value) is large as the analysis result. Since it is thereby possible to send only the characteristic frequency, the production management device 100, etc. having received this signal can efficiently determine the failure state of the machine tool with little information. It should be noted that, in the case of the amplitude values of at least a predetermined threshold being abundant, it is preferable to send only frequencies of the Kth highest order in descending order. K is a natural number of at least 1, and natural numbers between 2 and 20 are ideally used, for example. It should be noted that, in general words, the frequency spectrum having the largest amplitude is the frequency of the revolution speed of the spindle; however, since this frequency is obvious, it is suitable to remove this, and not include in the analysis results. It should be noted that, although an example of detecting the magnitude the amplitude, i.e. peak value of the spectrum, is shown herein, the intensity for every predetermined frequency range may be determined. In this case, the intensity of every respective frequency band may be included in the analysis results to be sent. In addition, among the frequency spectral intensities obtained by Fourier transformation, since frequencies which are too high or too low clearly cannot serve as the target of analysis, it is suitable to eliminate.

Next, the analysis/detection unit 226 of the control device 22 sends the analysis results obtained in this way via the network 102. The transmission processing of these analysis results corresponds to Step S4-4 in FIG. 4. The analysis results are sent to every respective manufacturing cell 104, collected in the production management device 100 via the network 102, and used in determination of spindle failure. It should be noted that this transmission processing is preferably executed every fixed period. It is possible to assume various cycles as this period. The analysis/detection unit 226 also can be configured by programs realizing the functions explained thus far, a CPU executing these programs, and an interface with the network 102. The non-transitory computer readable medium encoded with these programs corresponds to a preferred example of a non-transitory computer readable medium encoded with a computer program in the claims.

3. Detection of spindle failure

In the present embodiment, the analysis results are sent from the plurality of manufacturing cells 104 via the network 102 in this way. These analysis results are matters showing the operating state of the machine tool included in the manufacturing cell 104. In sending the operating state, i.e. the feedback signal itself, the information load thereof tends to become enormous. Therefore, in the present embodiment, it is configured to convert into frequency spectral intensity, and send only information of a frequency having a strong intensity thereamong. Therefore, it is possible to reduce the information volume, as well as possible to collect the operating states of machine tools in the production management device 100 rapidly.

Then, in the present embodiment, it is premised on the basic specifications of the machine tool to be managed, at least the specification of the spindle, being the same specification. This is because performing failure detection is facilitated if the same specification, since a signal of a different frequency from the other machine tools will be generated during failure. Furthermore, it is premised on each spindle rotating at the same revolution speed in the non-processing state. In the case of the processing state, since signals of various frequencies occur according to the contents of processing, diagnosis of failure is considered to be difficult. Premised on these matters, detection of spindle failure in a plurality of machine tools connected by the network 102 will be explained.

3.1 Principles (1) Principle 1

Prior to failure of the spindle, it is known that (amplitude of) a component having the frequency spectrum of the spindle vibration becomes larger. However, which component becomes larger differs according to each machine tool. Therefore, in the case of trying to detect spindle failure using such a characteristic, it is preferable to record the frequency spectrum of a normal operation case in advance. Then, it is possible to perform failure detection by examining the frequency spectral intensity of this machine tool routinely (periodically), and comparing with the previous frequency spectral intensity. In particular, in the case of detecting the frequency spectrum of the machine tool routinely, it is suitable to use the spectrum during processing. However, according to this principle, it is necessary to record data of during normal operation in advance, and thus a fixed preparation period before failure detection is necessary.

(2) Principle 2

Therefore, in the present embodiment, a technique of comparing frequency spectral intensities between each machine tool, without requiring the recording of the frequency spectral intensity during normal operation, will be explained mainly. By making a relative spectral comparison between machine tools of the same specification, it is possible to detect a machine tool having the above from thereamong. In the present embodiment, the spindle rotation of the same revolution speed is made to be performed using the same types of machine tools. This is performed routinely (periodically), analysis of the feedback signal at this time is performed in each control device 22, and the analysis results thereof are sent to the production management device 100 via the network 102. In addition, for example, it is suitable for the control device 22 to extract the $k^{th}$(e.g., $5^{th}$) largest frequencies among the frequency spectral intensity as analysis results, and send as selection results. The production management device 100 compares the sent analysis results between respective machine tools, and can find a machine tool having a frequency spectral intensity deviating from the other machine tools. In other words, for example, in a case of abnormality occurring in the spindle of a certain machine, a unique frequency component will be detected in the frequency spectral intensity thereof. In this case, upon an abnormality occurring, it is notified to the higher-order management section, and/or manufacturing cell 104 of the machine tool in which this abnormality occurred. According to the present embodiment, it is possible to perform failure diagnosis by such processing, even in a case of constituting the manufacturing cell 104 using a new machine tool for which the vibration frequency spectrum during failure is not clear.

4. Configuration of production management device and operation thereof

Figure 5:
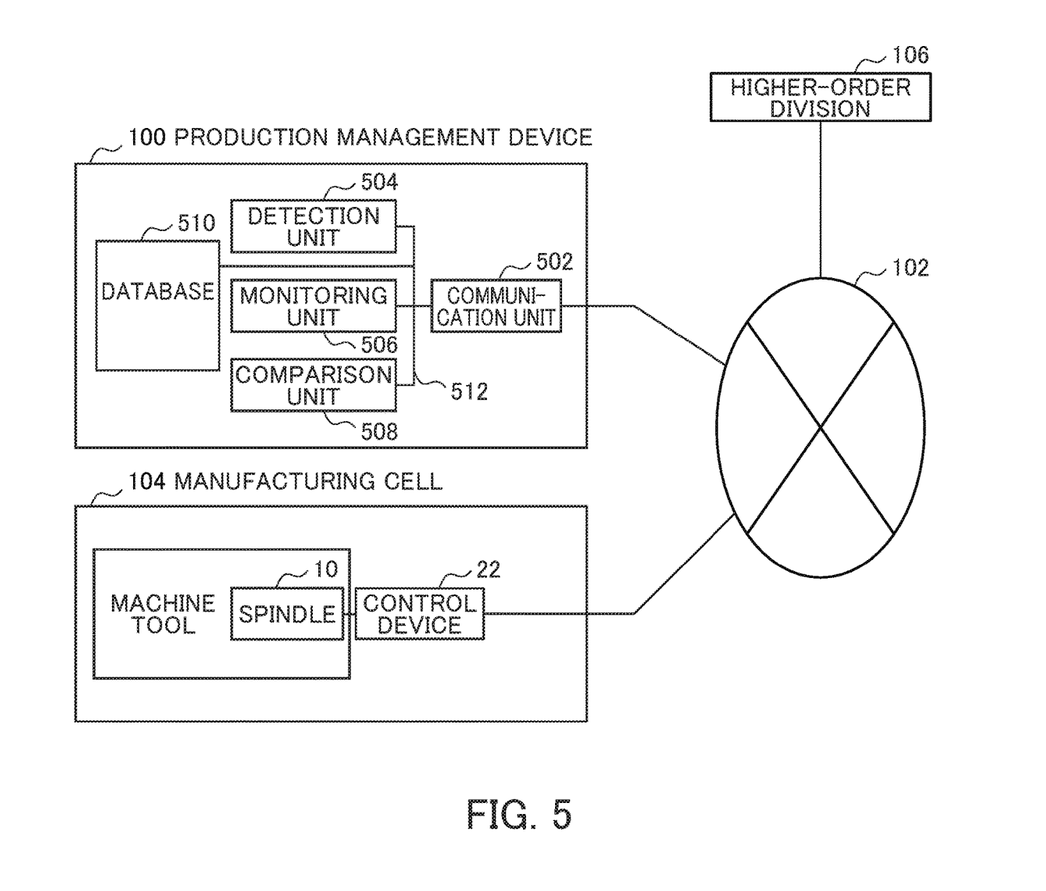
FIG. 5 is a configurational block diagram of a production management system.

A configuration diagram of the production management system 30 centered around the configurational block diagram of the production management device 100 is shown in FIG. 5. The production management device 100 is configured from a communication unit 502, detection unit 504, monitoring unit 506, comparison unit 508, database 510, and a bus 512 linking these configurations. The production management device 100 is constituted by a computer basically, and each constituting part is mainly configured from a computer program realizing the functions thereof, and a CPU executing this computer program.

4.1 Communication Unit

The communication unit 502 is an interface with the network 102, and is configured from hardware serving as the interface, a computer program controlling this, and a CPU executing the computer program.

4.2 Detection Unit

The detection unit 504 is a portion detecting the analysis results received by the communication unit 502, and is configured from a computer program realizing the functions thereof, and a CPU executing this. When the communication unit 502 receives the analysis results, the detection unit of the present embodiment compares these between machine tools. In other words, it compares the vibration states. Then, if there is a machine tool for which the vibration state differs from others, this is determined as spindle failure. In the case of determining spindle failure, this fact is notified to the manufacturing cell 104 in which this corresponding machine tool is included, and processing such as stop is performed. In addition, a report to the higher-order management section is performed simultaneously, whereby report of the machine tool in which spindle failure occurred and the manufacturing cell thereof is made. Such a comparison is concretely realized by performing comparison of sent frequencies. In the aforementioned way, since k-number of frequencies in descending order of the frequency spectral intensity are sent, the frequencies are compared, and it is determined as failure not occurring if being the same frequencies. However, since they are considered as not being completely identical, and some error is included, it is appropriate to determine that these frequencies are identical frequencies if being a difference on the order of a predetermined m %. Herein, m is a predetermined real number. For example, it is also appropriate to choose between 0.1 and 10. Between 0.1 and 20 may be selected. The detection unit 504 corresponds to a preferred example of a detection unit in the claims.

4.3 Monitoring Unit, Comparison Unit, and Database

The monitoring unit 506 performs monitoring of the frequency spectral intensity, and records in the database 510. The comparison unit 508 compares the sent frequency spectral intensity with a past frequency spectrum, and if there is a difference greater than a predetermined threshold, it is determined that spindle failure has occurred. The comparison unit 508, in the case of spindle failure occurring, reports to the detection unit 504, and the detection unit 504 notifies this fact to the manufacturing cell including the machine tool in which spindle failure occurred, as well as performing notification to the higher-order management section, similarly to as mentioned above. The monitoring unit 506 and comparison unit 508 are configured from a computer program realizing the above-mentioned functions, and a CPU executing this computer program. In addition, the database 510 can be configured by a predetermined storage means.

5. Modified Examples (1) Although a feedback signal is used in the above-mentioned embodiment, the feedback signal may employ a signal representing the electric current, speed or position of the servomotor 20. In addition, so long as being a signal representing the operation of the servomotor 20, any signal may be employed as the feedback signal. In addition, "speed" may be angular velocity, or may be revolution speed (rpm, etc.). In addition, the "position" may be rotation angle, or may be rotation amount (angle). In addition, among electric current, speed or position, it may be only a signal of any one type, or may employ two or more types of signals.

(2) In the above-mentioned embodiment, amplitude and peak value are explained as the frequency spectral intensity. Furthermore, intensity of signal may be the root mean squared value, or may be an average value, for example.

Although an embodiment of the present invention has been explained in detail above, the aforementioned embodiment is merely showing a specific example upon implementing the present invention. The technical scope of the present invention is not to be limited to this embodiment. The present invention is capable of various modifications in a scope not departing from the gist thereof, and these are also included in the technical scope of the present invention.

EXPLANATION OF REFERENCE NUMERALS 10 spindle
11 bearing
12, 12a, 12b sensor
14, 24 amplifier
16 analysis device
20 servomotor
21 feed shaft
22 control device
30 production management system
100 management device
102 network
104 manufacturing cell
106 higher-order management section
222 feedback acquisition unit
224 servomotor control unit
226 analysis/detection unit
502 communication unit
504 detection unit
506 monitoring unit
508 comparison unit
510 database
512 bus

What is claimed is:

1. A management system comprising a network, a plurality of manufacturing cells connected to the network, and a management device that is connected to the network and manages the plurality of manufacturing cells,
wherein each of the manufacturing cell includes:
a machine tool of a same type as a machine tool in another of the manufacturing cells; and
a control device that controls the machine tool, analyzes a vibration state of a spindle positioning shaft of the machine tool, and sends an analysis result via the network,
wherein the control device, in a case of the machine tool being in a non-processing state, sends via the network as the analysis result only frequency spectral intensities having an intensity of at least a predetermined value, among frequency spectral intensities obtained by conducting Fourier transformation on a feedback signal of a servomotor for driving the spindle positioning shaft when rotating the spindle of the machine tool at the same revolution speed as a machine tool in another of the manufacturing cells, and
wherein the management device includes:
a communication unit that receives the analysis result sent by the control device; and
a detection unit that compares the analysis results thus received, and compares vibration states among each of the machine tools of the plurality of manufacturing cells, so as to detect spindle failure of a machine tool having a frequency spectral intensity differing from another of the machine tools, and wherein the communication unit, in a case of the detection unit detecting the spindle failure, sends a failure signal via the network.

2. The management system according to claim 1, wherein the detection unit compares frequency spectral intensities of the vibration state of each of the machine tools based on the analysis results thus received, detects a frequency spectrum having an intensity differing by at least a predetermined threshold, and periodically monitors a change in intensity of the spectrum detected so as to detect spindle failure of the machine tool.

3. The management system according to claim 1, wherein the detection unit compares frequency spectral intensities of the vibration state of each of the machine tools based on the analysis results thus received, and determines that spindle failure occurred in the machine tool having a frequency spectral intensity that differs in intensity by at least a predetermined threshold.

4. The management system according to claim 1, wherein the communication unit periodically receives spectral intensity of predetermined frequency range in the analysis results via the network.

5. The management system according to claim 1, wherein the communication unit, in a case of the detection unit detecting the spindle failure, sends a failure signal via the network to either one or both of a higher-order control device and the manufacturing cell having the machine tool in which the spindle failure was detected.

6. A method of detecting spindle failure that detects spindle failure in a machine tool by employing the management device used in the management system according to claim 1, the method comprising:

a first communication step of receiving the analysis result of only frequency spectral intensities having an intensity of at least a predetermined value, sent by the control device;

a detection step of comparing the analysis result thus received, comparing the vibration state among each of the machine tools of the plurality of manufacturing cells, and detecting spindle failure in a machine tool having a frequency spectral intensity differing from another of the machine tools; and a second communication step of sending a failure signal via the network, in a case of detecting the spindle failure in the detection step.

7. A non-transitory computer readable medium encoded with a computer program enabling a computer to function as the management device used in the management system according to claim 1, the program causing the computer to execute:

first communication processing of receiving the analysis result of only frequency spectral intensities having an intensity of at least a predetermined value, sent by the control device;

detection processing of comparing the analysis result thus received, comparing the vibration state among each of the machine tools of the plurality of manufacturing cells, and detecting spindle failure in a machine tool having a frequency spectral intensity differing from another of the machine tools; and a second communication processing of sending a failure signal via the network, in a case of detecting the spindle failure in the detection processing.

* * * * *